US008210001B2

(12) United States Patent
Allan et al.

(10) Patent No.: US 8,210,001 B2
(45) Date of Patent: Jul. 3, 2012

(54) METHOD OF PRODUCING UNIFORM LIGHT TRANSMISSION FUSION DRAWN GLASS

(75) Inventors: Douglas Clippinger Allan, Corning, NY (US); Kenneth William Aniolek, Painted Post, NY (US); Kiat Chyai Kang, Painted Post, NY (US); Eunyoung Park, Elmira, NY (US)

(73) Assignee: Corning Incorporated, Corning, NY (US)

( * ) Notice: Subject to any disclaimer, the term of this patent is extended or adjusted under 35 U.S.C. 154(b) by 55 days.

(21) Appl. No.: 12/943,282

(22) Filed: Nov. 10, 2010

(65) Prior Publication Data

US 2012/0111055 A1     May 10, 2012

(51) Int. Cl.
*C03B 17/00*     (2006.01)
*C03B 17/06*     (2006.01)

(52) U.S. Cl. ............... 65/53; 65/29.1; 65/29.12; 65/90; 65/195

(58) Field of Classification Search ............ 65/29.1, 65/29.11, 29.12, 29.19, 29.21, 45, 53, 66, 65/83, 84, 85, 90, 195, 204
See application file for complete search history.

(56) References Cited

U.S. PATENT DOCUMENTS

| 6,758,064 | B1* | 7/2004 | Kariya | 65/91 |
| 7,685,840 | B2* | 3/2010 | Allaire et al. | 65/29.12 |
| 7,984,625 | B2* | 7/2011 | Markham et al. | 65/29.12 |
| 8,037,716 | B2* | 10/2011 | Aniolek et al. | 65/95 |
| 2005/0120748 | A1* | 6/2005 | Xun et al. | 65/53 |
| 2006/0081009 | A1* | 4/2006 | Maldonado | 65/195 |
| 2007/0028681 | A1* | 2/2007 | Goforth et al. | 73/159 |
| 2007/0062219 | A1* | 3/2007 | Blevins et al. | 65/91 |
| 2007/0140311 | A1* | 6/2007 | House et al. | 374/100 |
| 2008/0066498 | A1* | 3/2008 | Markham et al. | 65/29.16 |
| 2008/0204741 | A1* | 8/2008 | Hill et al. | 356/239.7 |

FOREIGN PATENT DOCUMENTS

WO    WO2008093566     8/2008

* cited by examiner

*Primary Examiner* — Jason L. Lazorcik
(74) *Attorney, Agent, or Firm* — Siwen Chen

(57) ABSTRACT

In a method of making a glass sheet using an overflow fusion downdraw process, a glass sheet quality metric level $Q_1$ is selected, where $Q_1$ is a measure of allowable retardation in the glass sheet. A glass ribbon temperature $T_1$ at which a potential glass ribbon thermal artifact could occur in a glass ribbon while the glass ribbon is being drawn through a drawing machine enclosure is identified. A thermal artifact envelope $E_1$ is determined, where $E_1$ contains types of glass ribbon thermal artifacts allowable at $T_1$ and $Q_1$. A glass melt is overflowed from an isopipe to form a glass ribbon at the root of the isopipe. The glass ribbon is drawn below the root of the isopipe through the drawing machine enclosure to form the glass sheet. The drawing machine enclosure is altered at a location corresponding to where the glass ribbon would be at $T_1$ such that during drawing of the glass ribbon the potential glass ribbon thermal artifact is not formed in the glass ribbon at $T_1$ or, if the potential glass ribbon thermal artifact is formed in the glass ribbon at $T_1$, the potential glass ribbon thermal artifact is within $E_1$.

14 Claims, 5 Drawing Sheets

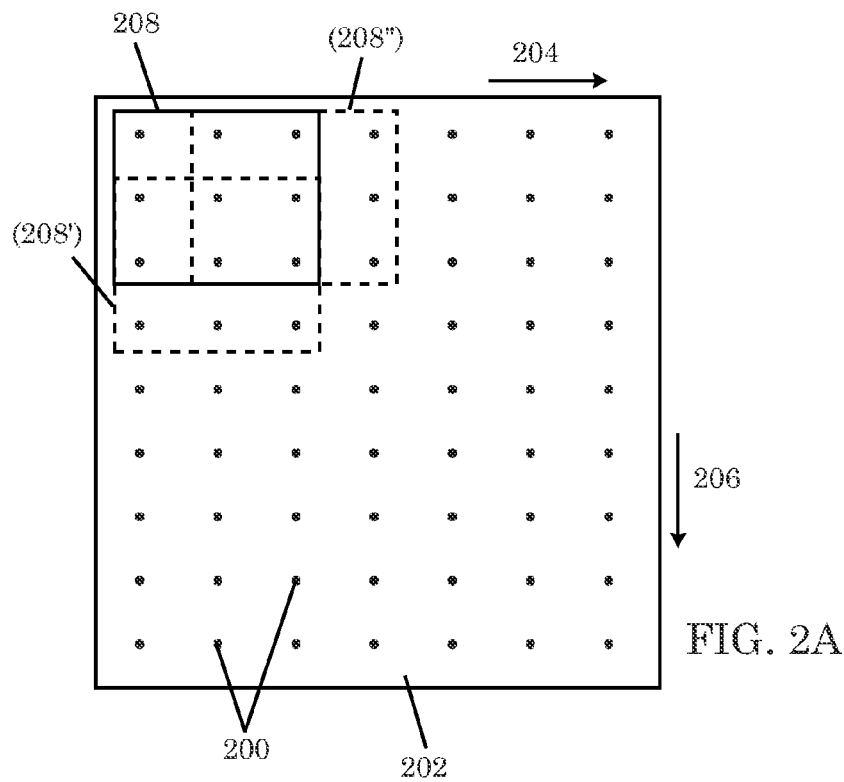
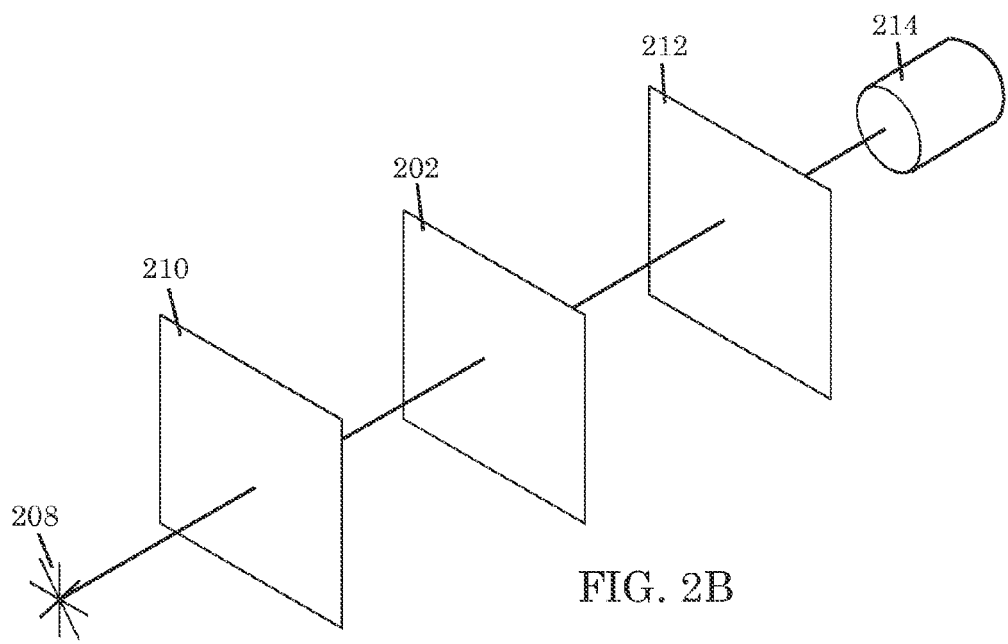

METHOD OF PRODUCING UNIFORM LIGHT TRANSMISSION FUSION DRAWN GLASS

TECHNICAL FIELD

The present invention relates generally to methods for reducing visible imperfections in display devices and to methods of making glass sheets. More specifically, the present invention relates to a method for making a glass sheet with low birefringence using overflow fusion downdraw processes and to the use of such glass sheets as substrates for displays. The present invention is useful, e.g., in making glass substrates for liquid crystal displays.

BACKGROUND

Visible imperfections have been detected on certain display screens of thin film transistor liquid crystal display (TFT-LCD) devices. In the display industry, these visible imperfections are labeled as mura, a Japanese word meaning unevenness or blemish. Mura appears as regions of low contrast and non-uniform brightness on the display screen. There are various types of mura, e.g., spot-mura, line-mura, and blob-mura. While many factors are believed to impact the presence and severity of mura of a LCD display, a causal relationship has been established between vertical stress bands created in glass sheets formed by fusion processes and line-mura in display screens using the glass sheets. Specifically, non-uniform thermal gradients existing across a fusion drawing machine while a glass ribbon is in the viscous or viscous-elastic state and is being drawn through the fusion drawing machine can produce vertical stress bands in the glass ribbon that can become frozen into the glass ribbon. On a display screen using a glass sheet characterized by vertical stress bands, line-mura appears as vertical bands of non-uniform light transmission. Presently, line-mura occurs mostly in twisted nematic displays. However, there is also a possibility that line-mura could occur in vertical alignment displays. The present invention addresses mura in display devices attributable to stress-induced birefringence in glass sheets used in the display devices.

SUMMARY

In one aspect of the present invention, a method of making a glass sheet using an overflow fusion downdraw process comprises the steps of: (a) selecting a glass sheet quality metric level $Q_1$, $Q_1$ being a measure of allowable retardation in the glass sheet, (b) identifying a glass ribbon temperature $T_1$ at which a potential glass ribbon thermal artifact could occur in a glass ribbon while the glass ribbon is being drawn through a drawing machine enclosure, (c) determining a thermal artifact envelope $E_1$, $E_1$ containing types of glass ribbon thermal artifacts allowable at $T_1$ and $Q_1$, (d) overflowing a glass melt from an isopipe to form a glass ribbon at the root of the isopipe, (e) drawing the glass ribbon below the root of the isopipe through the drawing machine enclosure to form the glass sheet, and (f) altering the drawing machine enclosure at a location corresponding to where the glass ribbon would be at $T_1$ such that during step (e) the potential glass ribbon thermal artifact is not formed in the glass ribbon at $T_1$ or, if the potential glass ribbon thermal artifact is formed in the glass ribbon at $T_1$, the potential glass ribbon thermal artifact is within $E_1$.

In one embodiment of the first aspect, step (c) comprises the steps of: (c1) defining a plurality of test glass ribbon thermal artifacts, each test glass ribbon thermal artifact having an absolute maximum temperature difference $\Delta T_{max}$ and an effective width $W_{eff}$, (c2) applying the test thermal artifacts at a plurality of test glass ribbon temperatures to a plurality of test glass ribbons, (c3) obtaining a plurality of test glass sheets from the plurality of test glass ribbons, (c4) calculating a glass sheet quality metric for each of the test glass sheets, and (c5) generating a plurality of $\Delta T_{max}$ versus $W_{eff}$ curves as a function of glass sheet quality metric and glass ribbon temperature.

In one embodiment of the first aspect, step (c4) comprises the steps of: (c4)(i) measuring birefringence at a plurality of nodes on each of the test glass sheet, (c4)(ii) converting the birefringence measured at each of the nodes to light transmission intensity for a polarization-based display, (c4)(iii) calculating an average of the light transmission intensities; and (c4)(iv) designating the average as the glass sheet quality metric of the test glass sheet.

In one embodiment of the first aspect, in step (c4)(ii), the polarization-based display is a twisted nematic display.

In one embodiment of the first aspect, step (c4)(iii) comprises calculating a plurality of averages of the light transmission intensities over a plurality of groups of the nodes, and step (c4)(iv) comprises designating the maximum of the averages as the glass sheet quality metric.

The method of claim 2, wherein step (c) comprises the steps of: (c6) selecting a $\Delta T_{max}$ versus $W_{eff}$ curve valid for $T_1$ and $Q_1$ from the plurality of $\Delta T_{max}$ versus $W_{eff}$ curves, and (c7) determining $E_1$ from the selected $\Delta T_{max}$ versus $W_{eff}$ curve.

In one embodiment of the first aspect, step (f) comprises heating, cooling, or a combination of heating and cooling at the location in the drawing machine enclosure corresponding to where the glass ribbon would be at $T_1$ during step (e).

In one embodiment of the first aspect, step (f) comprises removing a source of the potential glass ribbon thermal artifact from the drawing machine enclosure prior to step (e).

In one embodiment of the first aspect, $T_1$ corresponds to a temperature where the glass ribbon is in the viscous or viscous-elastic state.

In one embodiment of the first aspect, $T_1$ is in a range from 600° C. to 1000° C.

In one embodiment of the first aspect, $Q_1$ in step (a) is correlated to a mura level of a polarization-based display.

In one embodiment of the first aspect, in step (a), $Q_1$ is approximately 1E-6 and the allowable retardation is approximately equal to or less than 0.201 nm.

In one embodiment of the first aspect, in step (a), $Q_1$ is approximately 1E-5 and the allowable retardation is approximately equal to or less than 0.646 nm.

In one embodiment of the first aspect, in step (a), $Q_1$ is approximately 1E-4 and the allowable retardation is approximately equal to or less than 2.01 nm.

It is to be understood that both the foregoing general description and the following detailed description are exemplary of the present invention and are intended to provide an overview or framework for understanding the nature and character of the present invention as it is claimed. The accompanying drawings are included to provide a further understanding of the present invention and are incorporated in and constitute a part of this specification. The drawings illustrate various embodiments of the present invention and together with the description serve to explain the principles and operation of the present invention.

BRIEF DESCRIPTION OF THE DRAWINGS

The following is a description of the figures in the accompanying drawings. The figures are not necessarily to scale.

FIG. 2A is a grid of measurement nodes on a glass substrate.

FIG. 2B is a setup for measuring birefringence on a glass substrate.

DETAILED DESCRIPTION

Additional features and advantages of the invention will be set forth in the detailed description that follows and, in part, will be readily apparent to those skilled in the art from that description or recognized by practicing the invention as described herein.

Figure 1:
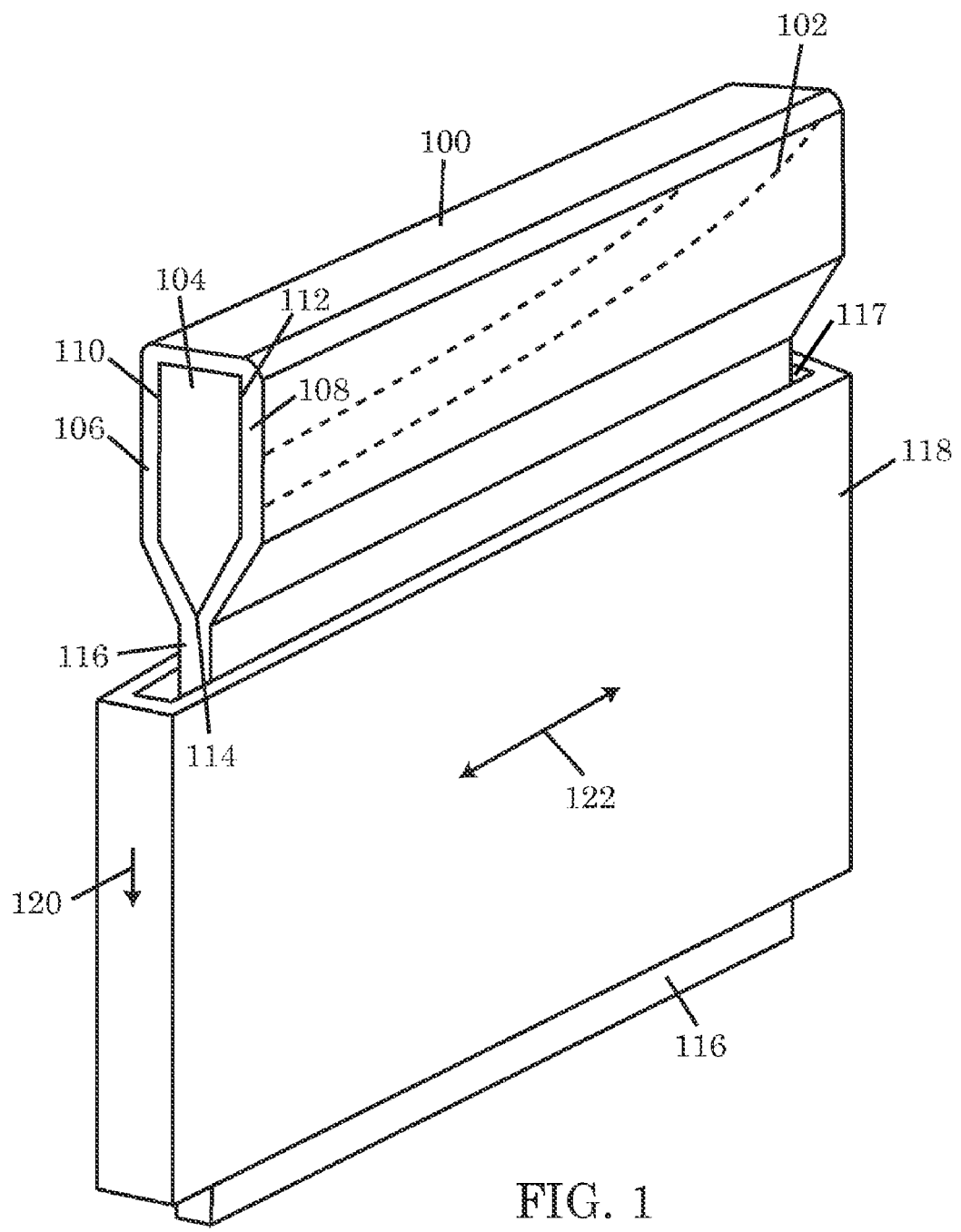
FIG. 1 illustrates an overflow fusion downdraw process for forming a glass ribbon.

In one aspect of the present invention, a glass sheet is made by an overflow fusion downdraw process, a leading process developed and used by Corning Incorporated, Corning, N.Y., for making precision glass sheets for use in various opto-electronic devices such as LCDs. The center of the overflow fusion downdraw process is a forming apparatus typically called "isopipe" comprising an upper trough-shaped part on top of a lower wedge-shaped part. As illustrated in FIG. 1, the overflow fusion downdraw process involves delivering molten glass 100 into a trough 102 of an isopipe 104 having two sidewalls 110, 112 called weirs. The molten glass 100 overflows the two weirs 110, 112 as two separate glass streams 106, 108. At the root 114 of the isopipe 104, the molten glass streams 106, 108 fuse into a single glass ribbon 116. The glass ribbon 116 is drawn through an enclosure 117 of a drawing machine 118, in a direction 120, to a final thickness. The drawing machine 118 includes mechanisms for controlling the temperature distribution in the glass ribbon 116 as the glass ribbon 116 is drawn down as well as mechanisms for guiding travel of the glass ribbon 116. At the bottom of the drawing machine 118, glass sheets are cut from the glass ribbon 116 and carried away for further processing. In the overflow fusion downdraw process, the outer surfaces of the molten glass streams 106, 108 do not touch the sidewalls 110, 112 of the isopipe 104 and are only exposed to the ambient air. As a result, the glass ribbon 116 formed by the fusion of the molten glass streams 106, 108 has pristine surfaces. Every effort is made to maintain the pristine nature of the surfaces of the quality area of the glass ribbon 116 in the drawing machine 118 so that high-quality glass sheets can be obtained at the bottom of the drawing machine 118. As will be further explained below, steps are taken to control or eliminate glass ribbon thermal artifacts while the glass ribbon 116 is in the viscous or viscous-elastic state. Here, a glass ribbon thermal artifact is an area of a glass ribbon characterized by unwanted localized thermal gradient.

In general, the source(s) of the thermal artifact(s) may vary from one drawing machine to another. One potential source of glass ribbon thermal artifact is the design of the drawing machine, e.g., if the drawing machine enclosure wall is not made of a single continuous material across the width of the drawing machine. Another potential source of glass ribbon thermal artifact is equipment inserted into the drawing machine, e.g., a temperature measurement device inserted into the drawing machine to measure thermal radiation in the drawing machine. Another potential source of thermal artifact is inconsistent distance between the glass ribbon and the drawing machine enclosure walls, which may be related to the design of the drawing machine or to uneven thickness of the glass ribbon due to, for example, poor temperature control within the drawing machine. If a glass ribbon thermal artifact is present in the glass ribbon while the glass ribbon is either in the viscous or viscous-elastic state, the glass ribbon thermal artifact will induce stress in the glass ribbon. The induced stress will be dragged with the glass ribbon along the drawing machine. At the glass-setting zone, the induced stress will become frozen into the glass. This frozen induced stress is what would appear as a vertical stress band in the final glass sheet. Multiple glass ribbon thermal artifacts can create multiple vertical stress bands in the final glass sheet. The severity of the vertical stress band(s) on the quality of the final glass sheet will depend on the attributes of the glass ribbon thermal artifact. A glass ribbon thermal artifact can be characterized by $\Delta T_{max}$ and $W_{eff}$, where $\Delta T_{max}$ is the absolute maximum temperature difference observed in the glass ribbon thermal artifact and $W_{eff}$ is the effective width of the glass ribbon thermal artifact. By absolute maximum temperature difference, it is meant the absolute value of the difference between the lowest temperature and the highest temperature observed on the glass ribbon thermal artifact.

As mentioned in the background of this specification, mura appears as vertical bands of non-uniform light transmission in display devices using glass sheets characterized by vertical stress bands. In one aspect of the present invention, it is proposed to control mura in a display device by controlling stress-induced birefringence in the glass sheet used in the display device. It is also proposed to control stress-induced birefringence in the glass sheet by controlling glass ribbon thermal artifacts during production of the glass sheet. In particular, glass ribbon thermal artifacts are either reduced or eliminated to reduce or eliminate stress-induced birefringence in the glass sheet. For the purpose of controlling glass ribbon thermal artifacts, a glass sheet quality metric Q is defined. Q is sensitive to glass sheet birefringence, which is sensitive to glass sheet stress, which is sensitive to glass ribbon thermal artifact. Q can be correlated to mura level. Thus, through Q, mura can be related to glass ribbon thermal artifact. In one embodiment of the present invention, Q has a plurality of levels, e.g., Level 1, Level 2, and Level 3, with Level 3 being the most difficult to achieve in a overflow fusion downdraw process and Level 1 being the least difficult to achieve in an overflow fusion downdraw process. Level 2 is between Level 1 and Level 3 in terms of difficulty. Each Q level has a corresponding mura level.

To determine Q for any glass sheet, a grid of M×N measurement nodes are superimposed on the glass sheet, where M and N are integers and are each greater than 1. FIG. 2A shows a grid of measurement nodes 200 on a glass sheet 202. Relative to a drawing machine, the horizontal direction 204 is the direction (122 in FIG. 1) across the draw and the vertical direction 206 is the direction (120 in FIG. 1) down the draw. The spacing density of measurement nodes in the across-the-draw (ATD) direction 204 may or may not be the same as the spacing density in the down-the-draw (DTD) direction 206.

Next, birefringence is measured at each node. Note that birefringence measurement may be done physically or by modeling. A setup for measuring birefringence is shown in FIG. 2B. The setup includes, in order, a light source 208, a first polarizer 210 to generate polarized light at 45° with the main stress axis of the glass sheet 202, the glass sheet 202, a second polarizer 212 to get a light intensity dependent on the phase shift at the glass sheet 202, and a detector 214 to detect light passing through the second polarizer 212. The first polarizer 210 and the second polarizer 212 are crossed polarizers, i.e. their axes are 90° apart. Each measurement node provides retardation (nm) and azimuth (degrees) values. Azimuth is angle of the slow axis of polarization relative to the right horizontal direction, where slow axis means the polarization axis with the higher optical index of refraction. (Light with a higher index of refraction travels more slowly.) Retardation is an optical path difference with units of length (typically nm) and represents an average optical index of refraction times the glass thickness along the light path through the glass sheet. In a birefringent glass sheet the optical path will be different for different polarizations of light. The birefringence measurement described here finds the linear polarization direction that has the largest possible optical path (the slow axis polarization angle) and measures the optical path difference (the retardation) and the angle. Birefringence is taken to mean the index difference between slow and fast axes, so it has the same units as index of refraction, which is to say it is dimensionless. Birefringence times sheet thickness gives retardation.

The birefringence data for each node (i.e., retardation and azimuth values) is converted into light transmission intensity using the following equation:

$$I = I_0 \cos^2(2\theta_{slow})\sin^2\left[\frac{\pi}{\lambda}R\right] \quad (1)$$

In Equation (1), I is light transmission intensity, $I_o$ is intensity incident on first polarizer, R is retardation (nm), $\theta_{slow}$ is azimuth of slow axis (degrees), and $\lambda$ is wavelength of the light (nm). Equation (1) is valid for twisted nematic display designs where the crossed polarizers in the display have their axes at ±45° to the sheet horizontal and vertical directions (204, 206 in FIG. 2A). Note that if the slow axis angle were itself 45°, the light transmission intensity of Equation (1) would be zero, i.e., no mura would appear in the display device. For vertical alignment display designs, the crossed polarizers are aligned with the sheet horizontal and vertical axes, and Equation (1) is modified by replacing the cos function by a sin function. Q is a moving average of the light transmission intensities calculated for the glass sheet using Equation (1). The moving average is calculated as follows. First, an average of light transmission intensities is calculated over m×n nodes in an m×n matrix, where m and n are integers, m<<M, and n<<N. For illustration purposes, a window 208 enclosing a 3×3 matrix, corresponding to m=n=3, is shown in FIG. 2A. The 3×3 matrix represents 9 transmission nodes over which an average of light transmission intensities is calculated for the window 208. The window 208 is moved across and down the glass sheet 202 (as indicated, for example, at 208' and 208"), and the average of light transmission intensities is calculated over the window 208 after each move, until the entire glass sheet 202 has been processed in this manner. Therefore, there will be a plurality of averages of light transmission intensities calculated over the entire glass sheet 202. Q is designated as the maximum of these averages. Other kinds of averaging may be used in place of this exemplary choice.

Each Q value or level has an associated retardation level, which can be approximated in the following fashion. Ignore the role of averaging in the definition of Q, or, in other words, consider that the retardation is also a similar averaged value. Next, take the worst-case value of azimuth angle in Equation (1), i.e., $\theta_{slow}=0$. Without averaging, the Q value is just the fraction of light intensity that is transmitted through crossed polarizers, i.e., $Q=I/I_0$. This gives the relation:

$$R = \frac{\lambda}{\pi} \cdot \sin^{-1}(\sqrt{Q}) \quad (2)$$

In Equation (2), R represents retardation, $\lambda$ represents wavelength of the instrument used to measure retardation, and Q represents glass sheet quality metric. Equation (2) can be solved for typical values of Q. Table 1 below shows examples of Q values or levels and associated approximate retardation level. In the calculations shown in Table 1, the assumed wavelength is 633 nm. For each target level of Q, if all the retardation values were at or below the retardation associated with the target level of Q, the target level of Q would be met. For example, if all the retardation values were at or below 0.201 nm, Q level of 1E-6 would be met.

TABLE 1

| Level | Q | R (nm) |
|---|---|---|
| 1 | 1.00E-06 | 0.201 |
| 2 | 1.00E-05 | 0.646 |
| 3 | 1.00E-04 | 2.01 |

Figure 3:
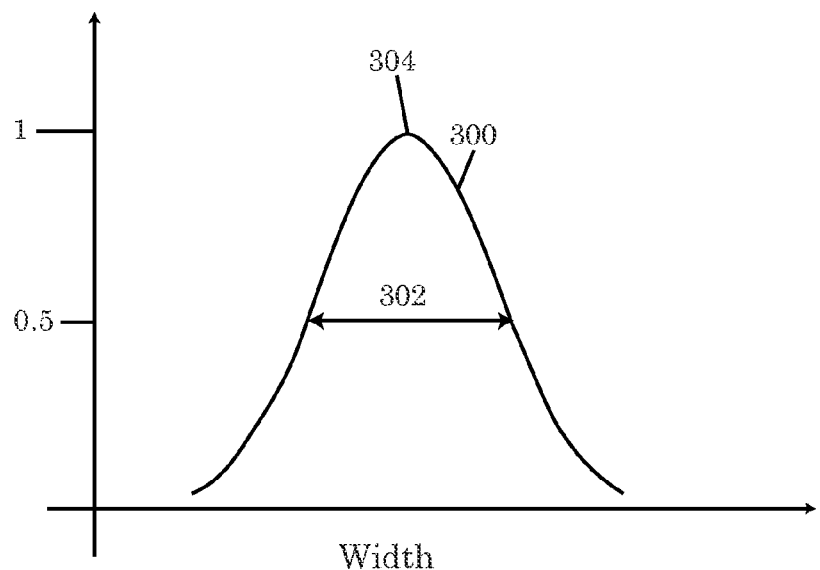
FIG. 3 is a two-dimensional representation of a thermal artifact.

Temperature gradient across a drawing machine enclosure is driven primarily through radiation heat transfer and may be approximated as having the characteristics of a Gaussian feature. For this reason, in one embodiment of the present invention, a glass ribbon thermal artifact is represented as a Gaussian feature. FIG. 3 shows a two-dimensional representation of a glass ribbon thermal artifact 300 as a Gaussian feature. The glass ribbon thermal artifact 300 can be described as having an absolute maximum temperature difference $\Delta T_{max}$ and an effective width $W_{eff}$. $\Delta T_{max}$ of the glass ribbon thermal artifact 300 occurs at 304. $W_{eff}$ is more difficult to define because real thermal features are not necessarily exactly of a Gaussian shape. However, in one embodiment of the present invention, $W_{eff}$ of the glass ribbon thermal artifact 300 is defined as Full-Width-Half-Max (FWHM) of the Gaussian feature. FWHM, which is indicated at 302, is the width of the Gaussian feature at half of $\Delta T_{max}$. The FWHM parameter may also be used to describe an effective width of a glass ribbon thermal artifact even when the glass ribbon thermal artifact is represented as a non-Gaussian feature. Other definitions of $W_{eff}$ besides FWHM may also be used.

Figure 4:
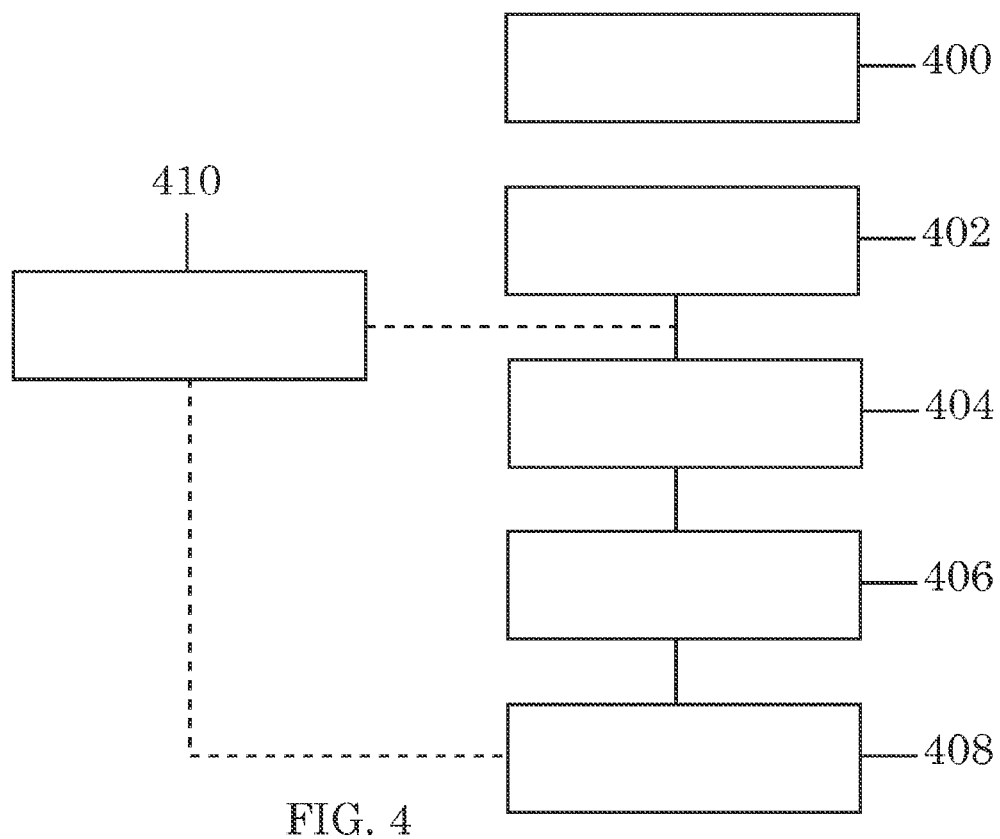
FIG. 4 is a flowchart illustrating a method of making a glass sheet using an overflow fusion downdraw process.
Figure 5A:
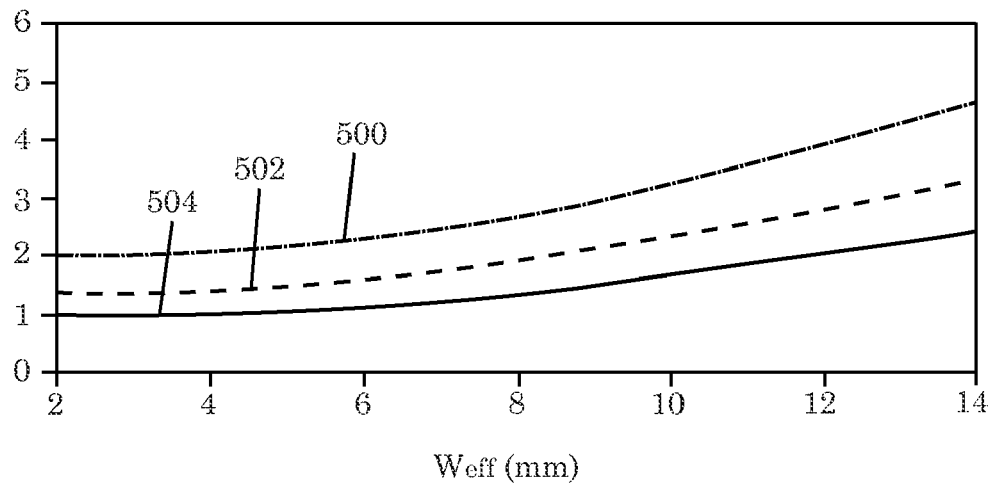
FIG. 5A shows $\Delta T_{max}$ versus $W_{eff}$ as a function of glass sheet quality metric level at a first glass ribbon temperature.
Figure 5B:
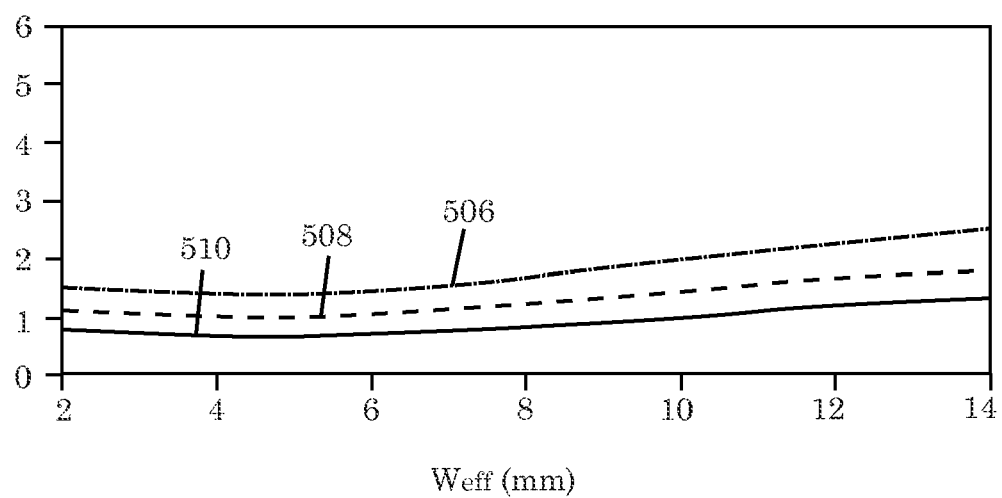
FIG. 5B shows $\Delta T_{max}$ versus $W_{eff}$ as a function of glass sheet quality metric level at a second glass ribbon temperature.
Figure 5C:
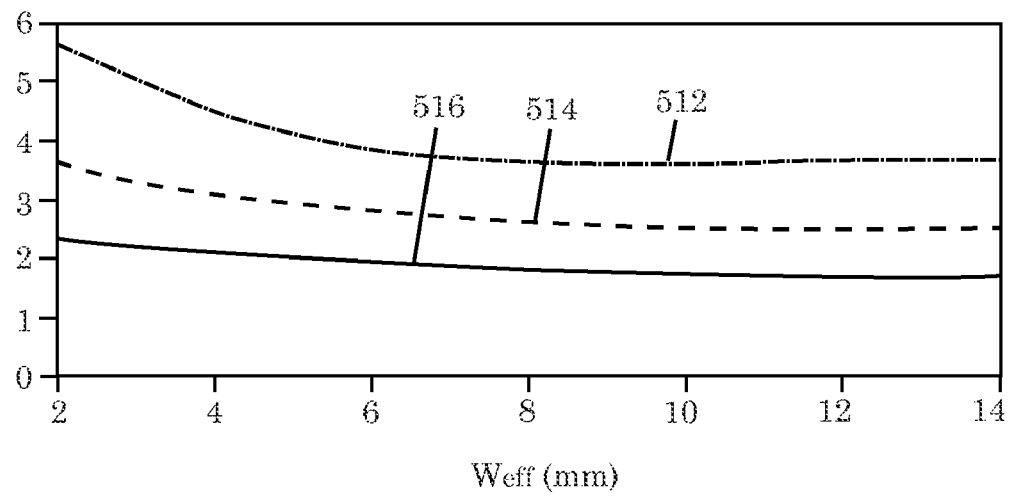
FIG. 5C shows $\Delta T_{max}$ versus $W_{eff}$ as a function of glass sheet quality metric level at a third glass ribbon temperature.

FIG. 4 is a flowchart illustrating a method of making a glass sheet according to one embodiment of the present invention. The method involves, at 400, determining a relationship between glass ribbon temperature T, glass ribbon thermal artifact thermal gradient K, and glass sheet quality metric Q. This determining a relationship involves a number of steps. First, a plurality of $\Delta T_{max}$ versus $W_{eff}$ curves for a plurality of Q levels and a plurality of glass ribbon temperatures is generated. The area under each $\Delta T_{max}$ versus $W_{eff}$ curve represents an envelope of safe $\Delta T_{max}$ and $W_{eff}$ for the particular Q level $Q_1$ and particular glass ribbon temperature $T_1$ associated with the curve. Stated in another way, the envelope contains types of glass ribbon thermal artifacts allowable at $Q_1$ and $T_1$. The glass ribbon thermal artifact thermal gradient K may be expressed as $\Delta T_{max}/W_{eff}$. In one embodiment, each $\Delta T_{max}$ versus $W_{eff}$ curve is a plot of $\Delta T_{max}$ as a function of FWHM for a particular Q level $Q_1$ at a particular glass ribbon temperature $T_1$. Here glass ribbon temperature is taken to be the temperature the glass ribbon would have had in the absence of the glass ribbon thermal artifact. For illustration purposes, examples of $\Delta T_{max}$ versus $W_{eff}$ curves are shown in FIGS. 5A, 5B, and 5C. For the particular overflow fusion downdraw process analyzed, FIG. 5A shows $\Delta T_{max}$ versus $W_{eff}$ curves 500, 502, 504 corresponding to Level 1, Level 2, and Level 3 of Q, respectively, at a glass ribbon temperature of 802° C. FIG. 5B shows $\Delta T_{max}$ versus $W_{eff}$ curves 506, 508, 510 corresponding to Level 1, Level 2, and Level 3 of Q, respectively, at a glass ribbon temperature of 752° C. FIG. 5C shows $\Delta T_{max}$ versus $W_{eff}$ curves 512, 514, 516 corresponding to Level 1, Level 2, and Level 3 of Q, respectively, at a glass ribbon temperature of 719° C. The group of $\Delta T_{max}$ versus $W_{eff}$ curves in each of FIGS. 5A, 5B, and 5C depict sensitivity of Q to glass ribbon thermal artifacts at a specific glass ribbon temperature. It should be noted that the numerical values shown in FIGS. 5A, 5B, and 5C will depend on the particular overflow fusion downdraw process analyzed and should not be considered as limiting the present invention. A number of observations can be made from the $\Delta T_{max}$ versus $W_{eff}$ curves in any of FIGS. 5A-5C. For example, FIG. 5A shows that a glass ribbon thermal artifact characterized by $\Delta T_{max}$ of 2° C. and FWHM (or $W_{eff}$) of 2 mm can be tolerated at 802° C. at Q Level 1, but not at Q Level 2 or Q Level 3.

Figure 6:
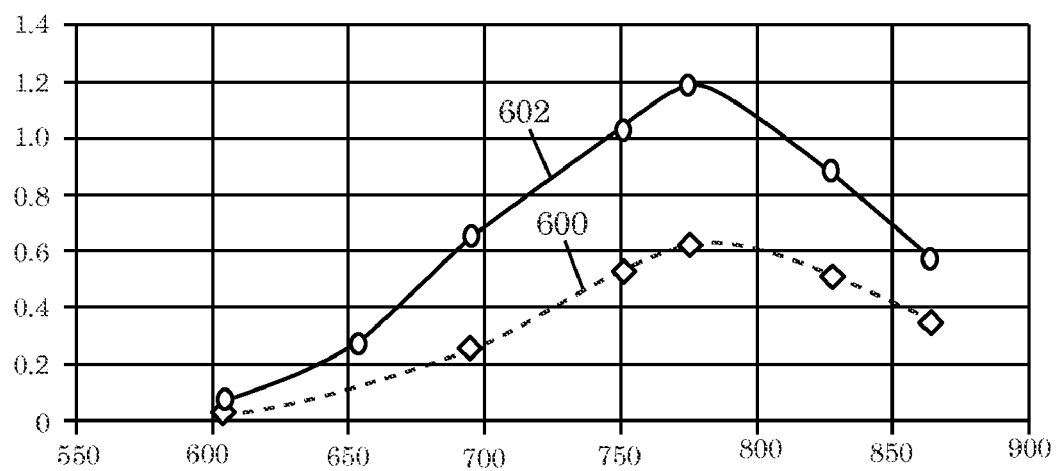
FIG. 6 is a plot of retardation versus glass ribbon temperature for two different thermal artifacts applied to a glass ribbon.

Construction of the $\Delta T_{max}$ versus $W_{eff}$ curves involves modeling an overflow fusion downdraw process with glass ribbon thermal artifacts at various glass ribbon temperatures T and measuring Q for glass sheets resulting from the overflow fusion downdraw processes. Modeling may be done numerically with a mathematical model involving the thermal environment of the glass ribbon and prediction of the resulting frozen-in stresses and the associated birefringence or may involve making actual measurements on a drawing machine. In one example, a test glass ribbon thermal artifact with a known $\Delta T_{max}$ and $W_{eff}$ is applied to a test glass ribbon at a selected glass ribbon temperature. Typically, the selected glass ribbon temperature will correspond to a temperature at which the test glass ribbon is in the viscous or viscous-elastic state. In one embodiment, the test glass ribbon temperature is between 600° C. and 1000° C. The applied test glass ribbon thermal artifact results in stress in the test glass ribbon, which would be reflected in birefringence measurements made on a test glass sheet obtained from the test glass ribbon. For the test glass sheet, Q is determined as described above. The process is repeated with another test glass ribbon thermal artifact or another glass ribbon temperature until enough data has been gathered to generate the $\Delta T_{max}$ versus $W_{eff}$ curves at the various Q levels and glass ribbon temperatures T. To generate the curves, the test glass ribbon thermal artifacts are separated into groups depending on the Q associated with each of the test glass ribbon thermal artifacts and the glass ribbon temperature at which the test glass ribbon thermal artifact was applied to a test glass ribbon. Each group is then used to generate a $\Delta T_{max}$ versus $W_{eff}$ curve. FIG. 6 shows retardation versus glass ribbon temperature from applying two test glass ribbon thermal artifacts having $\Delta T$ of 2° C. (curve 600) and 4° C. (curve 602), respectively, separately to a test glass ribbon.

Referring back to FIG. 4, the method, at 402, further involves identifying one or more glass ribbon temperatures $T_1$ at which one or more potential glass ribbon thermal artifacts could occur in a glass ribbon while the glass ribbon is being drawn through a drawing machine enclosure. This involves identifying the source(s) of the potential glass ribbon thermal artifact(s) in an overflow fusion downdraw process. There are a variety of ways of identifying the source of a glass ribbon thermal artifact in an overflow fusion downdraw process. In one example, a design of the drawing machine is obtained and an overflow fusion downdraw process using the drawing machine is modeled. The temperature distribution in a glass ribbon formed in the drawing machine is examined to identify the source of a glass ribbon thermal artifact. In another example, a glass sheet is obtained from a glass ribbon formed in the drawing machine. Birefringence measurements are made on the glass sheet to identify a region of stress in the glass sheet, where stress in the glass sheet may be attributed to a glass ribbon thermal artifact. A birefringence map created from the birefringence measurements can be superimposed on the design of the drawing machine to identify the source of the glass ribbon thermal artifact. In another example, the temperature distribution within the drawing machine enclosure may be measured while a glass ribbon is being drawn down the drawing machine enclosure. The temperature distribution can be modeled to identify the source of glass ribbon thermal artifact in the drawing machine enclosure. The absolute maximum temperature difference $\Delta T_{max,1}$ and effective width $W_{eff,1}$ of each potential glass ribbon thermal artifact is also determined from modeling or measurement of the temperature distribution in a drawing machine enclosure or glass ribbon.

The method, at 404, further involves selecting a $\Delta T_{max}$ versus $W_{eff}$ curve for a desired glass sheet quality metric $Q_1$ from the $\Delta T_{max}$ versus $W_{eff}$ curves obtained in step 400 for each potential glass ribbon thermal artifact. For example, if the potential glass ribbon thermal artifact could occur at a glass ribbon temperature of 802° C. and a glass sheet quality metric Level 1 is desired, then the $\Delta T_{max}$ versus $W_{eff}$ curve corresponding to glass sheet quality metric Level 1 in FIG. 5A, i.e., curve 500, would be selected. The method, at 406, further involves overflowing molten glass from an isopipe as described above. The method, at 408, further involves drawing the glass ribbon formed at the root of the fusion pipe through a drawing machine enclosure into a glass sheet as described above. Measures are taken either during step 408 or before step 404 to ensure that if the potential glass ribbon thermal artifact forms in the glass ribbon, the $\Delta T_{max,1}$ and $W_{eff,1}$ of the potential glass ribbon thermal artifact stay within the envelope of safe $\Delta T_{max}$ and $W_{eff}$ defined by the selected $\Delta T_{max}$ versus $W_{eff}$ curve for the potential glass ribbon thermal artifact. In one embodiment, the measures taken involve redesigning the drawing machine to remove the source of the potential glass ribbon thermal artifact. In another embodiment, the measures taken involve heating, cooling, or a combination of heating and cooling at a location in the drawing machine enclosure where the glass ribbon would have temperature $T_1$ at which the potential glass ribbon thermal artifact could occur so that if the potential glass ribbon thermal artifact does occur $\Delta T_{max,1}$ and $W_{eff,1}$ stay within acceptable limits.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of making a glass sheet using an overflow fusion downdraw process, comprising the steps of:
   (a) defining a glass sheet quality metric Q, Q being a measure related to retardation in a glass sheet;
   wherein Q is determined, either physically or by modeling, according to the steps of
      (a1) superimposing a grid of measurement nodes on a glass sheet, and
      (a2) measuring birefringence at each node;
   (b) selecting a glass sheet quality metric level $Q_1$, $Q_1$ being an allowable level of Q for the glass sheet product;
   (c) identifying a glass ribbon temperature $T_1$ at which a which a glass ribbon will be drawn inside a drawing machine enclosure;
   (d) determining a relationship between the glass sheet quality metric Q and the effective width, $W_{eff}$, and the absolute maximum temperature difference, $\Delta T_{max}$, of thermal anomalies in the glass ribbon for the glass ribbon at the glass ribbon temperature, $T_1$;
   (e) generating a curve of $\Delta T_{max}$ versus $W_{eff}$ based on the relationship determined in step
   (d) to define an envelope of thermal anomalies, $E_1$, of the glass ribbon at temperature $T_1$, which are allowable for a glass sheet quality metric level $Q_1$;
   (f) overflowing a glass melt from an isopipe to form a glass ribbon at the root of the isopipe;
   (g) drawing the glass ribbon below the root of the isopipe through the drawing machine enclosure at the temperature $T_1$;
   (h) forming a glass sheet from the glass ribbon;
   (i) obtaining quality metric Q of the glass sheet obtained from step (h);
   (j) correlating the quality metric Q of the glass sheet obtained in step (i) with the temperature distribution in the glass ribbon inside the drawing machine enclosure to locate thermal artifacts and to determine the absolute maximum temperature difference ΔTmax and effective width Weff of each located thermal artifact; and
   (k) heating or cooling, or a combination of heating and cooling at the location in the drawing machine enclosure corresponding to the source of the located thermal artifact so that effective width of thermal anomaly in the glass sheet, Weff, and the absolute maximum temperature difference of said thermal anomaly in the glass ribbon, $\Delta T_{max}$, are maintained within the allowable envelope of thermal anomalies, $E_1$, to thereby produce a glass sheet having a quality metric level, $Q_1$.

2. The method of claim 1, wherein step (e) comprises the steps of:
   (e1) defining a plurality of test glass ribbon thermal artifacts, each test glass ribbon thermal artifact having an absolute maximum temperature difference $\Delta T_{max}$ and an effective width $W_{eff}$;
   (e2) applying the test thermal artifacts at a plurality of test glass ribbon temperatures to a plurality of test glass ribbons;
   (e3) obtaining a plurality of test glass sheets from the plurality of test glass ribbons;
   (e4) calculating a glass sheet quality metric for each of the test glass sheets; and
   (e5) generating a plurality of $\Delta T_{max}$ versus $W_{eff}$ curves as a function of glass sheet quality metric and glass ribbon temperature.

3. The method of claim 2, wherein step (e4) comprises the steps of:
   (e4)(i) measuring birefringence at a plurality of nodes on each of the test glass sheet;
   (e4)(ii) converting the birefringence measured at each of the nodes to light transmission intensity for a polarization-based display;
   (e4)(iii) calculating an average of the light transmission intensities; and
   (e4)(iv) designating the average as the glass sheet quality metric of the test glass sheet.

4. The method of claim 3, wherein step (e4)(iii) comprises calculating a plurality of averages of the light transmission intensities over a plurality of groups of the nodes and step (e4)(iv) comprises designating the maximum of the averages as the glass sheet quality metric.

5. The method of claim 2, wherein step (e) further comprises the steps of:
   (e6) selecting a $\Delta T_{max}$ versus $W_{eff}$ curve valid for $T_1$ and $Q_1$ from the plurality of $\Delta T_{max}$ versus $W_{eff}$ curves; and
   (e7) determining $E_1$ from the selected $\Delta T_{max}$ versus $W_{eff}$ curve.

6. The method of claim 1, wherein $T_1$ corresponds to a temperature where the glass ribbon is in the viscous or viscous-elastic state.

7. The method of claim 6, wherein $T_1$ is in a range from 600° C. to 1000° C.

8. The method of claim 1, $Q_1$ in step (b) is correlated to a mura level of a polarization-based display.

9. The method of claim 1, wherein in step (b), $Q_1$ is approximately 1E-6 and the allowable retardation is approximately equal to or less than 0.201 nm.

10. The method of claim 1, wherein in step (b), $Q_1$ is approximately 1E-5 and the allowable retardation is approximately equal to or less than 0.646 nm.

11. The method of claim 1, wherein in step (b), $Q_1$ is approximately 1E-4 and the allowable retardation is approximately equal to or less than 2.01 nm.

12. The method of claim 1, wherein step (a) further comprises:
   (a3) converting the birefringence measurements to light transmission intensity measurements.

13. The method of claim 12, wherein step (a) further comprises:
   (a4) calculating Q by averaging the light intensity measurements over sub-matrix of the nodes.

14. The method of claim 1, wherein step (a) further comprises:
   (a4) calculating Q by averaging the birefringence measurements.

* * * * *